United States Patent [19]

Hummel et al.

[11] 4,086,123

[45] Apr. 25, 1978

[54] ZINC SULFIDE BASED PIGMENTS

[75] Inventors: Floyd A. Hummel, State College; Charussri Sombuthawee, University Park, both of Pa.

[73] Assignee: Ferro Corporation, Cleveland, Ohio

[21] Appl. No.: 772,287

[22] Filed: Feb. 25, 1977

[51] Int. Cl.² .............................................. C09C 1/04
[52] U.S. Cl. ............................... 106/293; 106/288 B; 106/306; 106/302
[58] Field of Search ................... 106/288 B, 293, 306, 106/302

[56] References Cited

U.S. PATENT DOCUMENTS

| 3,091,544 | 5/1963 | Hund et al. | 106/288 B |
|---|---|---|---|
| 3,802,900 | 4/1974 | Broll et al. | 106/293 |
| 3,847,639 | 11/1974 | Broll et al. | 106/293 |
| 3,852,404 | 12/1974 | Daly | 106/293 |

Primary Examiner—Winston A. Douglas
Assistant Examiner—J. V. Howard
Attorney, Agent, or Firm—Milton L. Simmons; Wesley B. Taylor

[57] ABSTRACT

Pigments are disclosed comprising zinc sulfide as a host containing in solid solution at least a sufficient amount of a metal sulfide additive or dopant to alter the color of the zinc sulfide. The dopant may comprise one or more certain metal sulfides but normally is present as a unitary sulfide, such as lithium sulfide, or preferably as a multiple sulfide, such as lithium indium sulfide and copper indium sulfide. Optionally, a binary metal compound dopant can include a metal oxide. The pigments may be prepared by encapsulating the host and dopant metal sulfides in vacuum to prevent introduction of oxides and then heating to an equilibrium temperature.

17 Claims, No Drawings

ZINC SULFIDE BASED PIGMENTS

BACKGROUND OF THE INVENTION

Pigments are widely used in many industries to impart basically a pleasing, esthetic color and appearance to various media in which they are mixed, such as paints, varnishes, lacquers, organic resins, glazes, ceramic ware such as procelain enamels, glass, and the like. As a general rule, inorganic pigments have a greater scope of application as compared to organic pigments. Because of the more severe and drastic conditions of use in glazes and ceramic applications, particularly with reference to temperature of preparation, inorganic pigments must be used for such applications. However, inorganic pigments may also be added to organic media, such as organic resinous polymeric materials, especially when such materials are used at relatively high temperatures such as in extruding or molding.

Important inorganic red pigments include those of the cadmium sulfide-cadmium selenide series. Two additionally important inorganic yellow pigments are based on cadmium sulfide and lead antimonate (Naples Yellow). As awareness of the need for environmental protection grows, industrial use of toxic and semi-toxic chemicals has come under greater scrutiny and criticism. The use of such metals as cadmium, selenium, lead and antimony, previously extensively employed in preparing pigments, has accordingly become less popular. Stronger governmental regulation and control of their use are expected. It is, therefore, important to develop substitute pigments.

SUMMARY OF THE INVENTION

It has been found that colorful pigments can be prepared, free of metals such as cadmium, selenium, lead and antimony, by using zinc sulfide as a host and combining in solid solution with the zinc sulfide at least a sufficient amount of certain other specific metal sulfides as an additive or dopant to alter the color of the zinc sulfide. The dopant may consist of one or more of certain metal sulfides but is normally a single sulfide, such as lithium sulfide, and preferably comprises a binary sulfide, such as lithium indium sulfide and copper indium sulfide. The dopant may also include a ternary sulfide system. It has also been found that in a multiple sulfide dopant, the the dopant may include a metal oxide such as copper oxide or lithium oxide.

The amount of dopant that may be added to the zinc sulfide host ranges from just enough to alter the color of the host to the maximum limit of solubility of the dopant in the host. However, pigments containing more dopant, resulting in a double phase system, are useful and not excluded. Where two or more metal sulfides are jointly added as dopants, their relative amounts inter se can vary widely to meet varying color requirements. Similarly, where a metal oxide is included with other dopants, it can be used up to an amount at which the color of the resulting pigment is so degraded that the pigment cannot be used as such.

The pigments may be prepared by encapsulating the host zinc sulfide and one or more of the other identified metal sulfides, and optionally metal oxides, together under a vacuum and heating. This procedure prevents the introduction of large amounts of unwanted metal oxides. The heating preferably is carried out by a slowly rising temperature to an equilibrium temperature and for a time at the equilibrium temperature to achieve solution of the additive dopants with the host zinc sulfide.

DESCRIPTION OF THE PREFERRED EMBODIMENTS

In general, the pigments of the present invention comprise at least two metal sulfides in solid solution including zinc sulfide as a host and one or more certain other metal sulfides as additives or dopants. Useful metal sulfide dopants includes lithium sulfide, calcium sulfide, gallium sulfide, lithium indium sulfide, lithium indium sulfide and copper indium sulfide, lithium indium sulfide and silver indium sulfide, lithium sulfide and chromium sulfide, indium sulfide and copper oxide, indium sulfide and lithium oxide, lithium sulfide and manganese sulfide and copper sulfide, and mixtures thereof.

While, as indicated, mixtures of the identified dopants can be used, normally the dopant is present either as a unitary sulfide of those described, such as lithium sulfide, or a binary metal sulfide dopant of those described, such as lithium indium sulfide and copper indium sulfide. Ternary dopants systems are also possible, such as lithium sulfide, manganese sulfide, and copper sulfide. Preferred dopants include the variously indicated sulfides of lithium. Where the metal of the sulfide is copper, it is preferably in the cuprous form but can also be in the cupric form.

The amount of additive or dopant used with respect to the zinc sulfide host is not critical and may vary widely. As little as only that minimum amount needed to alter the color of the zinc sulfide may be used up to the solubility limit of the dopant or dopants in the host. Even this is not the maximum amount of dopant that may be used. Amounts of dopant up to the solubility limit in the host result in pigments of a single phase system. Larger amounts of dopants can still be used, although the pigments then comprise a multiple phase system. The presence of a double or other multiple phase system does not necessarily destroy the effectiveness of the more desirable single phase system, although it is usually preferred that the pigment be entirely single phased. The inclusion of a double phase pigment usually tends to reduce the brilliance of the color of the pigment and impart a muddy, rather washed out hue. However, such pigments are still useful. Indeed, some pigment applications require a less brilliant hue. Without intending to limit the relative amounts usable, in general a dopant is present in an amount ranging from about 0.5 mole percent of the zinc sulfide up to the solubility limit of the dopant and, more usually, from about 1 mole percent to about 10 mole percent of the zinc sulfide.

When the dopant includes two or more metal sulfides, the same situation prevails as to relative proportions. The amounts of dopants added and the relative amounts inter se of the severally added metal sulfides can vary widely, since the pigments comprise solid solutions where the components need not necessarily be present in any fixed chemical or stoichiometric proportions. As a general rule of use rather than necessity, when a binary metal sulfide dopant is used, each component of each binary dopant may be present in an amount ranging from about 35 mole percent to about 65 mole percent of the binary dopant. In a preferred use, the components of a binary dopant may be present in substantially equal molar proportions It is surprising that the present pigments accept metal oxides with little or no degradation of color. Previously, the practice has been to guard against the introduction of metal oxides, especially in the preparation of the pigments, since metal oxides were definitely regarded as being detrimental. However, it has been discovered that the dopants of the present pigments can include a metal oxide such as copper oxide or lithium oxide in appreciable amounts without seriously degrading the color. Another metal sulfide should be present as a dopant so that a metal oxide is used only in conjunction with one or more of the previously identified metal sulfide dopants and preferably as a third component in a ternary system including two other metal sulfide dopants. The amount of metal oxide used varies from a very small amount capable of altering the color of the pigment (any other component being present in constant amount for this test) to a maximum amount permissible which still provides pigment of useful color. As a rule, this amount for the metal oxide may range from about 1 mole percent to about 15 mole percent of the pigment.

All of the metal sulfides and metal oxides used are readily available. Preparation of the present pigments is not critical and, in one technique, is carried out by encosing zinc sulfide and one or more of the other specified metal sulfides in an evacuated, closed capsule and then heating to an equilibrium temperature, that is, to an elevated, thermodynamic equilibrium temperature at which there is not more reaction or solution taking place. Upon cooling, crystals of the pigment form.

In a preferred practice, the closed capsule is heated under a slowly rising temperature until the equilibrium temperature is reached and then maintained or thermally soaked at that temperature until reaction is complete. For example, the capsule may be heated from about 200° to about 1000° C. or higher at a rate of increase of about 10° per hour. Apparently, at higher heating rates, decomposition of the starting materials takes place resulting in a rapid increase in vapor pressure with possible consequent failure of the capsule. The sulfides are held at the maximum equilibrium temperature for 20 to 75 hours, as an example, as may be necessary for complete solution and then cooled to room temperature either slowly in a furnace or rapidly by plunging the capsule in cold water. A standard x-ray diffractometer identifies one or more phases present in the resulting pigment.

If desired, a flux may be added to the sulfides prior to heating to promote crystallization and more rapid attainment of thermodynamic equilibrium. For example, an equal molar proportion of sodium cloride and potassium chloride may be used as a flux.

The following examples are intended only to illustrate the invention and should not be construed as imposing limitations on the claims. Percentages are by mole percent unless otherwise indicated.

EXAMPLES 1 THROUGH 7

These examples illustrate pigments of ZnS and $LiInS_2$. In Example 1, amounts of ZnS, $Li_2S$ and $In_2S_3$ were weighed to an accuracy of 0.1 milligram and then dry mixed because $Li_2S$ tends to be sensitive to moisture. The amounts were chosen to yield a pigment comprising in mole percent 95% ZnS and 5% $LiInS_2$, it being noted that a mole each of $Li_2S$ and $In_2S_3$ is required to form two moles of $LiInS_2$.

A length of fused silica tubing having an inside diameter of 5 mm. and a wall thickness of 1 to 2 mm. was sealed at one end in an oxygen-gas flame. An amount of about 100 milligrams of the charge was placed in the silica tubing and a narrow capillary then drawn at the open end to insure against sample loss during evacuation. The open but narrowed end of the tube was then directly connected to a vacuum hose and the tubing evacuated for about two minutes by a vacuum pump capable of attaining a vacuum of $10^{-4}$ torr. The tubing was then sealed off by collapsing the capillary in an oxygen-gas flame to form an enclosed capsule.

The capsule was next placed in an electric Globar furnace maintained initially at about 200° C and slowly heated at a rate of increase of about 10° C to about 20° C per hour to a desired equilibrium temperature. Faster heating rates can result in decomposition of the starting sulfides with consequent explosion of the capsule. In Example 1, the capsule was heated to 850° C where it was maintained for 72 hours. The heat treatment was then terminated by plunging the capsule in cold water to obtain a resulting pigment which could be analyzed as to phases present by a standard x-ray diffractometer.

The same general procedure was followed for Examples 2 through 7. Table A summarizes the results. Additions of $LiInS_2$ to ZnS favored the formation of Wurtzite solid solutions at 850° C and yielded light yellow to yellow colors.

TABLE A

Pigments From The System $ZnS-LiInS_2$

| Ex. | $ZnS/LiInS_2$ Mole Ratio | Heat Treatment (° C/hrs.) | Phases Present | Color |
|---|---|---|---|---|
| 1 | 95: 5 | 850/72 | Wurtzite S.S. | Light Yellow |
| 2 | 90:10 | 850/72 | Wurtzite S.S. | Light Yellow |
| 3 | 80:20 | 850/72 | Wurtzite S.S. | Light Yellow |
| 4 | 70:30 | 850/72 | Wurtzite S.S. | Light Yellow |
| 5 | 60:40 | 850/72 | Wurtzite S.S. + Unknown Phase | Yellow |
| 6 | 50:50 | 850/72 | Wurtzite S.S. + Unknown Phases | Yellow |
| 7 | 40:60 | 850/72 | Unknown Phases | Yellow |

EXAMPLES 8 THROUGH 10b

These examples illustrate a ternary system in which $LiInS_2$ and $CuInS_2$ were the dopants for ZnS. Procedures were carried out like the procedure of Example 1, except that some heat treatments were different, as shown in Table B. In this ternary system, additions in mole percent of 5 percent to 10 percent $LiInS_2$ and 5 percent to 10 percent of $CuInS_2$ in ZnS, followed by heating at 600° C for 48 hours produced a pigment containing both a zinc blende solid solution and a wurtzite solid solution (Example 8). After heating at 850° C for 72 hours, the two solid solutions coexisted with an unknown phase (Example 8a). The zinc blende solid solution disappeared when samples were heated at 1050° C for two additional hours (Example 8b). The pigment containing 5 percent $LiInS_2$ and 10 percent $CuInS_2$ in ZnS ultimately yielded one phase, a wurtzite solid solution, when subjected sequentially to the heat treatments of Examples 9 through 9b. This system yielded very interesting colors which varied from bright yellow to organge yellow in the temperature range from 600° C to 1050° C. Examples 10 through 10b indicate the results for successive heat treatments, as shown, for additions of 10 percent $LiInS_2$ and 10 percent $CuInS_2$ in ZnS. Table B summarizes the results.

TABLE B

Pigments from The System $ZnS-LiInS_2-CuInS_2$

| Example | Composition (mol %) ZnS$_2$ | LiInS$_2$ | CuInS$_2$ | Heat Treatment (° C/hrs.) | Phases Present | Color |
|---|---|---|---|---|---|---|
| 8 | 90 | 5 | 5 | 600/48 | Zinc blende S.S. + Wurtzite S.S. | Bright Yellow |
| 8a | | | | 850/72 | Zinc blende S.S. +Wurtzite S.S. +Unknown | Bright Yellow |
| 8b | | | | 1050/2 | Wurtzite S.S.+ Unknown | Bright Yellow |
| 9 | 85 | 5 | 10 | 600/48 | Zinc blende S.S. +Wurtzite S.S. | Orange Yellow |
| 9a | | | | 850/72 | Zinc blende S.S. +Wurtzite S.S. +Unknown | Orange Yellow |
| 9b | | | | 1050/2 | Wurtzite S.S. | Orange Yellow |
| 10 | 80 | 10 | 10 | 600/48 | Zinc blende S.S. +Wurtzite S.S. | Orange Yellow |
| 10a | | | | 850/72 | Zinc blende S.S. +Wurtzite S.S. +Unknown | Orange Yellow |
| 10b | | | | 1050/2 | Wurtzite S.S.+ Unknown | Orange Yellow |

The amounts of these examples only exemplify a somewhat broader range of preferred proportions, namely, in mole percent from about 76 percent to about 95 percent zinc sulfide, from about 2 percent to about 15 percent lithium indium sulfide, and from about 2 percent to about 15 percent copper indium sulfide.

EXAMPLES 11 AND 12

A procedure was carried out like the procedure of Example 1. A pigment containing 5 mole percent LiInS$_2$ and 5 percent AgInS$_2$ in ZnS, after heat treatment at 850° C for 72 hours, yielding a zinc blende solid solution. The crystal structure changed to a wurtzite solid solution when heated additionally at 1050° C for two hours. Both samples had a light yellow color. Proportions in this system, as an example, can range from about 80 percent to about 98 percent zinc sulfide, from about one percent to about 10 percent lithium indium sulfide, and from about one percent to about 10 percent silver indium sulfide.

EXAMPLES 13 THROUGH 15

It is a surprising development that zinc sulfide-based pigments accept metal oxides as dopants without degradation of color. These examples illustrate the inclusion of Cu$_2$O although CuO could have been used as well.

After firing at 850° C for 72 hours, the pigments of these examples were composed of a zinc blende solid solution and had colors which were essentially identical to those not containing oxygen. Example 14 contained a small amount of a wurtzite solid solution. The pigments in mole percent composition are shown by Table C.

TABLE C

Zinc Sulfide-Based Pigments Containing Metal Oxides

| Example 13 | Example 14 | Example 15 |
|---|---|---|
| 95% ZnS | 90% ZnS | 80% ZnS |
| 2.5% Cu$_2$O | 5% Cu$_2$O | 10% CU$_2$O |
| 2.5% In$_2$S$_3$ | 5% In$_2$S$_3$ | 10% In$_2$S$_3$ |

The amounts of these examples only exemplify a somewhat broader range of proportions. For example, a metal oxide may be present in an amount ranging from about 1 mole percent to about 15 mole percent of the pigment. A preferred range of proportions is from about 80 percent to about 95 percent zinc sulfide, from about 2.5 percent to about 10 percent indium sulfide, and from about 2.5 percent to about 10 percent copper oxide. In$_2$O$_3$ could have been used in place of Cu$_2$O.

EXAMPLE 16

A procedure was carried out like the procedure of Example 1, except that a quaternary system was prepared comprising in mole percent a host of from about 70 percent to about 98.5 percent zinc sulfide and, as dopants, from about 0.5 percent to about 10 percent lithium sulfide, from about 5 percent to about 10 percent manganese sulfide, and from about 0.5 percent to about 10 percent copper sulfide.

The pigments are used in a conventional manner to color ceramics, including porcelain enamels, glazes, glass, plastics, paints, varnishes, lacquers, and the like.

Although the foregoing describes several embodiments of the present invention, it is understood that the invention may be practiced in still other forms within the scope of the following claims.

We claim:

1. A pigment comprising a zinc sulfide host containing in solid solution at least a sufficient amount of a metal sulfide-containing dopant to alter the color of the zinc sulfide, said dopant being selected from the group consisting of lithium sulfide, calcium sulfide, gallium sulfide, lithium indium sulfide, lithium indium sulfide and copper indium sulfide, lithium indium sulfide and silver indium sulfide, lithium sulfide and chromium sulfide, indium sulfide and copper oxide, indium sulfide and lithium oxide, lithium sulfide and manganese sulfide and copper sulfide, and mixtures thereof.

2. A pigment of claim 1 in which said metal sulfide-containing dopant is present in an amount ranging from about 0.5 mole percent of the zinc sulfide to the solubility limit of the dopant in said zinc sulfide.

3. A pigment comprising a zinc sulfide host containing in solid solution at least a sufficient amount of a metal sulfide-containing dopant to alter the color of the zinc sulfide, said dopant comprising a unitary metal sulfide dopant selected from the group consisting of lithium sulfide, calcium sulfide, gallium sulfide, and lithium indium sulfide, a binary metal compound dopant selected from the group consisting of lithium indium sulfide and copper indium sulfide, lithium indium sulfide and silver indium sulfide, lithium sulfide and chromium sulfide, indium sulfide and copper oxide, and indium sulfide and lithium oxide, or a ternary metal sulfide dopant consisting essentially of lithium sulfide, manganese sulfide, and copper sulfide.

4. A pigment of claim 3 in which said metal sulfide-containing dopant is present in an amount ranging from about 1 mol percent to about 10 mol percent of the zinc sulfide.

5. A pigment of claim 3 in which each component of each binary dopant comprising two metal sulfides is present in an amount ranging from about 35 mol percent to about 65 mol percent of said binary dopant.

6. A pigment of claim 3 in which the components of a binary dopant comprising two metal sulfides are present in substantially equal molar proportions.

7. A pigment of claim 3 in which said copper oxide is selected from the group consisting of cuprous oxide and cupric oxide.

8. A pigment of claim 3 in which said binary metal compound dopant is a lithium-containing binary metal compound.

9. A pigment of claim 3 comprising in mol percent from about 40 percent to about 95 percent zinc sulfide and from about 5 percent to about 60 percent lithium indium sulfide.

10. A pigment of claim 3 comprising in mol percent from about 76 percent to about 95 percent zinc sulfide, from about 2 percent to about 15 percent lithium indium sulfide, and from about 2 percent to about 15 percent copper indium sulfide.

11. A pigment of claim 3 comprising in mol percent from about 70 percent to about 98.5 percent zinc sulfide, from about 0.5 percent to about 10 percent lithium sulfide, from about 5 percent to about 10 percent manganese sulfide, and from about 0.5 percent to about 10 percent copper sulfide.

12. A pigment of claim 1 in which said dopant includes a lithium-containing compound.

13. A pigment of claim 3 in which a binary metal sulfide dopant contains a metal oxide in an amount insufficient to degrade the desired color of the pigment.

14. A pigment of claim 3 in which a binary metal sulfide dopant contains a metal oxide in an amount insufficient to degrade the desired color of the pigment, said metal oxide being selected from the group consisting of copper oxide and lithium oxide.

15. A pigment of claim 13 in which said metal oxide is present in an amount ranging from about 1 mole percent to about 15 mole percent of the pigment.

16. A pigment of claim 1 comprising in mole percent from about 80 percent to about 95 percent zinc sulfide, from about 2.5 percent to about 10 percent indium sulfide, and from about 2.5 percent to about 10 percent copper oxide.

17. A pigment of claim 1 comprising in mole percent from about 80 percent to about 98 percent zinc sulfide, from about one percent to about 10 percent lithium indium sulfide, and from about one percent to about 10 percent silver indium sulfide.

* * * * *